(No Model.)
J. P. LAVIGNE.
MICROMETER GAGE.
No. 515,235.
Patented Feb. 20, 1894.
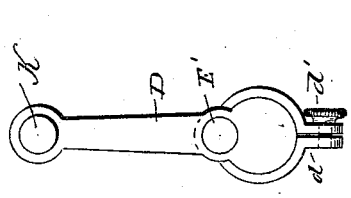
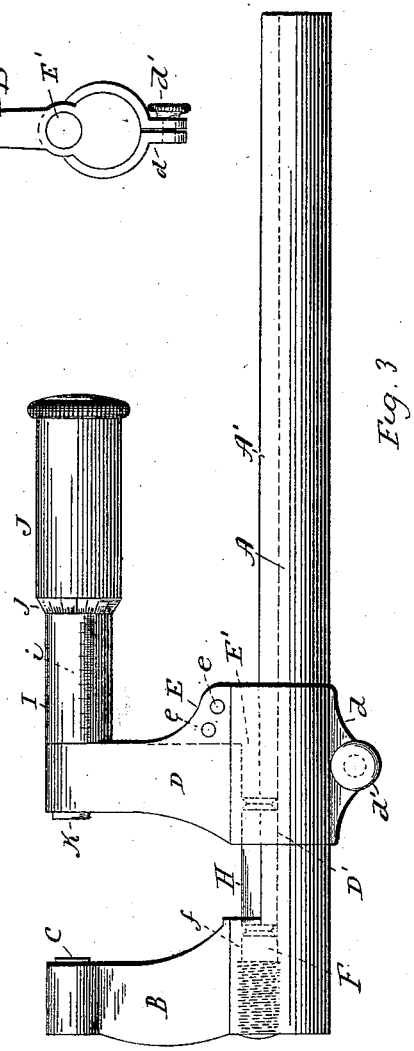
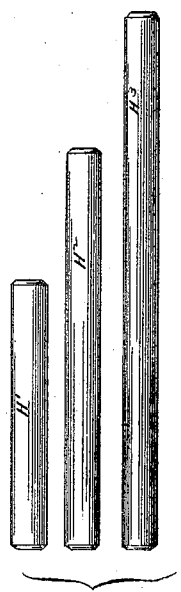

UNITED STATES PATENT OFFICE.

JOSEPH P. LAVIGNE, OF NEW HAVEN, CONNECTICUT.

MICROMETER-GAGE.

SPECIFICATION forming part of Letters Patent No. 515,235, dated February 20, 1894.

Application filed January 7, 1893. Serial No. 457,608. (No model.)

*To all whom it may concern:*

Be it known that I, JOSEPH P. LAVIGNE, of New Haven, in the county of New Haven and State of Connecticut, have invented new Improvements in Micrometer-Gages, (Case D;) and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a micrometer gage constructed in accordance with my invention; Fig. 2, a detached end view of the movable jaw; Fig. 3, a view showing three interchangeable measuring pieces designed for use with the instrument shown in the other figures.

My invention relates to an improvement in that class of micrometer gages in which the measuring of inches is done by a set of movable pieces differentiated in length by inches, the object being to produce an instrument which shall be simple to construct, and keep clean in use, and in which the factor of wear in use shall be reduced to the minimum.

With these ends in view, my invention consists in a micrometer gage having a beam and two measuring jaws, one of which is movable, and two or more movable measuring-pieces differentiated in length, adapted to be applied to the exterior of the beam, and co-operating with the said movable jaw to determine the position thereof with respect to the other jaw.

My invention further consists in a micrometer gage having a longitudinally grooved beam, furnished at one end with a fixed jaw, a movable jaw mounted on the said beam, means for measuring fractions of inches carried by the said movable jaw, and a series of movable measuring pieces adapted to fit into the groove in the beam, differentiated in length by inches, and designed to be interchanged to determine the separation of the fixed and movable jaws.

My invention further consists in certain details of construction and combinations of parts as will be hereinafter described and particularly recited in the claims.

As herein shown, my improved device has a solid beam A, circular in cross section, and constructed in its upper face with an open longitudinal groove or depression A'. A fixed jaw B, located at one end of this beam, is provided with an anvil C, of approved construction. A movable jaw D, mounted upon the beam, is bifurcated at its lower end, shaped to clasp the same, and furnished with lugs $d\,d$, receiving a clamping-screw $d'$. A key E, secured to the said movable jaw by rivets $e\,e$, is constructed at its lower end with a cylindrical portion E', conforming in its curvature to the curvature of the groove A'. This key forms positive means for preventing the movable jaw from turning on the beam, being thereto assisted by the clamping-screw $d'$. An adjusting-screw F, is mounted in the beam at the base of the jaw B, and in line with the groove A', a horizontal opening $f$ being provided to receive it. The said screw, however, is arranged so as not to extend to the inner end of the said opening which is left for occupation by one end of one of the cylindrical movable measuring pieces H, the opposite end of which is inserted into an alligned opening D', formed in the inner edge of the movable jaw D, the said opening D', extending through the said movable jaw, and being occupied in part by the cylindrical lower portion E', of the key E. Although only one of the cylindrical movable measuring pieces is used at one time in the instrument, it is designed that several such pieces H, H', $H^2$ and $H^3$ shall go with it, as shown by Fig. 3 of the drawings, the said pieces to be differentiated in length by inches. It will be understood that the curvature of the open groove or depression in the beam corresponds to the curvature of the measuring pieces which are applied sidewise to the exterior surface of the beam instead of being entered endwise into a chamber formed in the beam as provided for in my prior Patent No. 488,280, of December 20, 1892. When in the instrument the pieces are held in place by the insertion of their opposite ends into the holes $f$ D' before referred to, and as shown by Fig. 1 of the drawings. The measurement of inches is made by the use of the said movable pieces, which are chosen at the dictation of the work to be done.

The application of measuring pieces to the exterior surface of the beam, is an obviously advantageous construction, as it enables the beam to be kept perfectly clean in its adaptation to receive the measuring pieces, and also places the pieces where they can be observed and verified or seen to be in right adjustment or otherwise. My improved construction is also comparatively simple and inexpensive.

The measurement of fractions of inches is effected by means therefor mounted in the movable jaw D. As an illustration of such means, I have provided the said jaw with a fixed sleeve I, having graduations $i$, a rotatable sleeve J, having its beveled edge graduated, as at $j$, and a measuring-screw K, located within the said fixed and rotary sleeves, and coupled for rotation with the latter. These parts do not need further description, as they are well known in the art. I would have it understood that they may be replaced by any other suitable mechanism for the purpose.

When the device is to be used in making measurements of about an inch, the inch measuring piece H, is inserted between the fixed and movable jaws, which are then moved toward each other until the opposite ends of the said piece impinge against the adjacent ends of the adjustable screw F, and the cylindrical lower portion E', of the key E, the clamping-screw $d'$ being then manipulated to firmly bind the movable jaw upon the beam. On the other hand, if it is desired to secure measurements approximating two inches, the said clamping screw is loosened, the movable jaw pushed outward on the beam, the measuring piece H, removed, and the two inch measuring piece H' placed in the instrument in its stead. My design is that each instrument shall be provided with a set of movable pieces running from one inch up, according to the length of the beam.

It is obvious that in carrying out my invention some changes from the construction herein shown and described may be made, and I would therefore have it understood that I do not limit myself to the same, but hold myself at liberty to make such changes and alterations therein as fairly fall within the spirit and scope of my invention.

The use of measuring-pieces differentiated in length by inches is disclosed by United States Patent No. 488,280, granted to me December 20, 1892. I do not therefore now claim that idea broadly, but only the use of such pieces when applied to the exterior surface of the beam.

Having fully described my invention, what I claim as new, and desire to secure by Letters Patent, is—

1. A micrometer-gage having a solid beam constructed with an exterior open longitudinal groove or depression, and two measuring jaws, one of which is movably mounted upon the said beam, two or more movable measuring-pieces differentiated in length, adapted to be placed in the said open groove or depression in the exterior surface of the beam, from the side thereof and co-operating with the said movable jaw to determine the position thereof on the beam with respect to the other jaw, and means for measuring fractions of inches carried by one of said jaws, substantially as described.

2. A micrometer gage having a solid beam constructed with a longitudinal groove formed in its upper edge, and furnished at one end with a fixed jaw, and with an adjusting-screw located at the base thereof in a horizontal opening aligned with the said groove, a movable jaw mounted on the said beam, provided with a key fitting into the said groove of the beam, and having an opening aligned with the opening receiving the adjustable screw, means for measuring fractions of inches carried by the said movable jaw, and a series of cylindrical measuring pieces adapted to fit into the said groove, in which they are placed from the side of the beam and the opening in the base of the fixed jaw, and the opening in the movable jaw, and differentiated in length by inches, substantially as described.

In testimony whereof I have signed this specification in the presence of two subscribing witnesses.

JOSEPH P. LAVIGNE.

Witnesses:
FRED C. EARLE,
GEORGE D. SEYMOUR.